United States Patent
Takita et al.

(10) Patent No.: US 8,781,329 B2
(45) Date of Patent: Jul. 15, 2014

(54) DISPERSION COMPENSATION DESIGN METHOD AND DISPERSION COMPENSATION DESIGN SYSTEM

(75) Inventors: Yutaka Takita, Kawasaki (JP); Tomohiro Hashiguchi, Kawasaki (JP); Kazuyuki Tajima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 380 days.

(21) Appl. No.: 13/363,917

(22) Filed: Feb. 1, 2012

(65) Prior Publication Data
US 2012/0237214 A1  Sep. 20, 2012

(30) Foreign Application Priority Data
Mar. 15, 2011 (JP) .................................. 2011-057268

(51) Int. Cl.
 *H04J 14/02* (2006.01)
 *H04B 10/12* (2006.01)

(52) U.S. Cl.
 USPC ............................. 398/81; 398/147; 398/159

(58) Field of Classification Search
 CPC ........... H04B 10/2507; H04B 10/2513; H04B 10/25133
 USPC .................... 398/81, 147, 158, 159
 See application file for complete search history.

(56) References Cited

U.S. PATENT DOCUMENTS

| 7,382,979 | B2 | 6/2008 | Akiyama et al. | |
| 2006/0023641 | A1 | 2/2006 | Nakashima et al. | |
| 2006/0098987 | A1* | 5/2006 | Hoshida | 398/147 |
| 2006/0193638 | A1* | 8/2006 | Akiyama et al. | 398/147 |
| 2010/0080556 | A1* | 4/2010 | Takita et al. | 398/43 |
| 2010/0098434 | A1* | 4/2010 | Katagiri et al. | 398/159 |
| 2010/0215377 | A1* | 8/2010 | Tajima et al. | 398/147 |
| 2012/0123749 | A1* | 5/2012 | Watanabe et al. | 703/2 |
| 2012/0141137 | A1* | 6/2012 | Tajima et al. | 398/147 |

FOREIGN PATENT DOCUMENTS

| JP | 2006-042279 A | 2/2006 |
| JP | 2006-135788 A | 5/2006 |
| WO | WO-2005/006604 A | 1/2005 |

OTHER PUBLICATIONS

"Optimization of Discrete Systems", published Morikita Shuppan, Co., Ltd. May 2000, pp. 32-85.

* cited by examiner

*Primary Examiner* — Daniel Dobson
(74) *Attorney, Agent, or Firm* — Fujitsu Patent Center

(57) ABSTRACT

A dispersion compensation design system includes a segment dividing unit to divide an optical network into segments of a linear network or a ring network, a path classifying unit to classify one of paths of the optical network, as a specific type path, the one of the paths being incapable of transmitting an optical signal and contained in a longer path having a route longer than that of the one of the paths and capable of transmitting the optical signal, a segment reconfiguration unit to reconfigure the segments so as to maximize a number of the specific type paths, a dispersion compensation amount computing unit to compute a dispersion compensation amount in any of spans of the optical network so as to minimize the number of the specific type paths within the reconfigured segment, and an update unit to update the dispersion compensation amount with the computed dispersion compensation amount.

10 Claims, 15 Drawing Sheets

FIG.2

| DISPERSION COMPENSATION MENU |
|---|
| 100ps/nm |
| 200ps/nm |
| 300ps/nm |
| 400ps/nm |
| 500ps/nm |

FIG.4

| NUMBER OF SPANS | UPPER THRESHOLD OF ALLOWABLE RANGE | LOWER THRESHOLD OF ALLOWABLE RANGE |
|---|---|---|
| 1 | 70 [ps/nm] | -30 [ps/nm] |
| 2 | 63 | -23 |
| 3 | 56 | -16 |
| 4 | 49 | -9 |
| 5 | 42 | -2 |
| 6 | 35 | 5 |

FIG.5

| | | INITIAL NODE | | | | | |
|---|---|---|---|---|---|---|---|
| | | N1 | N2 | N3 | N4 | N5 | N6 |
| TERMINAL NODE | N2 | 5 | | | | | |
| | N3 | 10 | 5 | | | | |
| | N4 | 15 | 10 | 5 | | | |
| | N5 | 20 | 15 | 10 | 5 | | |
| | N6 | -3 | -8 | -13 | -18 | -23 | |
| | N7 | 32 | 27 | 22 | 17 | 12 | 35 |

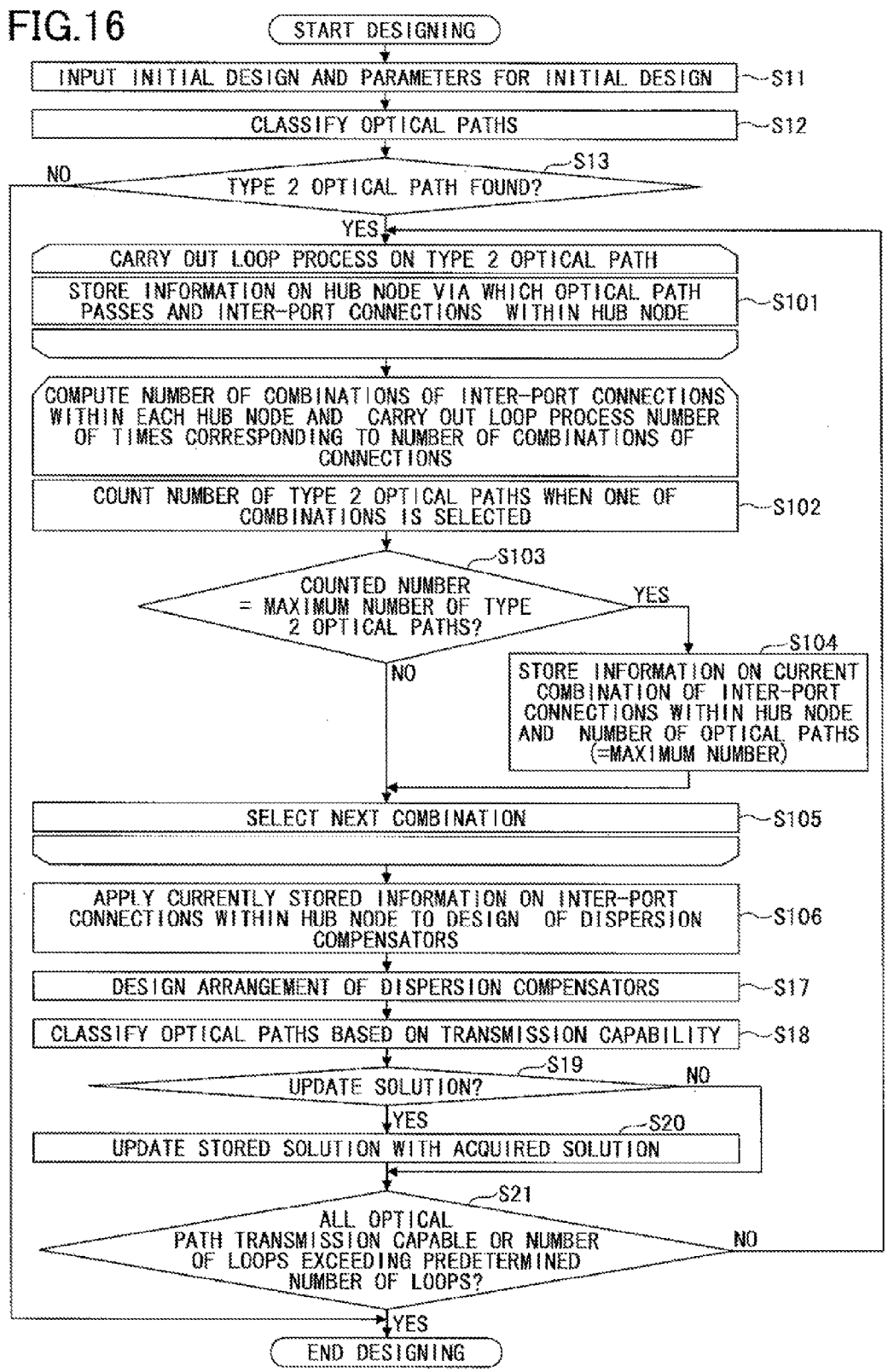

DISPERSION COMPENSATION DESIGN METHOD AND DISPERSION COMPENSATION DESIGN SYSTEM

CROSS-REFERENCE TO RELATED APPLICATION

This patent application is based upon, and claims the benefit of priority of Japanese Patent Application No. 2011-057268 filed on Mar. 15, 2011, the entire contents of which are incorporated herein by reference.

FIELD

The embodiments discussed herein are related to a dispersion compensation design method and a dispersion compensation design system.

BACKGROUND

With a recent dramatic increase in network traffic, a wavelength division multiplexing (WDM) technology has frequently been utilized for transmitting large amounts of information. In the WDM network technology field, a network structure having a complicated topology such as an interconnection network or a mesh network may be realized by an optical add-drop multiplexer (OADM) device or an optical hub (i.e., a wavelength cross-connect (WXC) device), which may serve as a function to add or drop one or more wavelength channel branches or switch the wavelength routes to pass through optical signals without converting the optical signals into electric signals.

Further, it has been desired to transmit the optical signals without converting them into electric signals in the middle of the optical signal transmission in order to reduce cost in the optical WDM network. However, in a typical optical fiber for use in optical signal transmission, light beams travel at different speeds corresponding to their optical wavelengths. Hence, even if a transmitting terminal simultaneously transmits the light beams having different optical wavelengths, a receiving terminal receives the transmitted light beams at different times based on the different optical wavelengths. This phenomenon is called "wavelength dispersion".

The optical signal is generally modulated before signal transmission. Specifically, the modulated optical signal has a certain bandwidth of a frequency; that is, the modulated optical signal is formed of light beams having different wavelengths within the certain bandwidth. Thus, the waveform of the received light beams may be deformed due to the wavelength dispersion. If the amount of deformation is too large, information carried by the light beams (i.e., the modulated optical signal) may not be received correctly. Accordingly, it is desirable to compensate the wavelength dispersion by allowing the light beams forming the deformed waveform to be passed through a dispersion compensation module (DCM) having a wavelength dispersion property opposite to that of an optical fiber residing in a signal transmission channel when the light is received by each of the nodes. With this technique, the light beams may be capable of being transmitted in a long distance without having deformation in the waveform of the light beams.

However, the amount of the wavelength dispersion appears to increase in proportion to the signal transmission distance of light beams. Further, different types of the optical fibers seem to have different properties. Accordingly, it may be necessary to prepare different dispersion compensators for various distances or different types of the optical fibers. Inexpensive dispersion compensators are generally formed of a passive component such as the optical fiber or the like. Thus, one type of the optical fiber may include a fixed property. Thus, it may be necessary to determine, in advance, where to appropriately arrange dispersion compensators having different properties. Therefore, dispersion compensation design is to determine where to appropriately arrange the dispersion compensators having different properties.

It is preferable that the compensation amount of the wavelength dispersion of the compensator match the amount of the wavelength dispersion necessary for the optical fiber subjected to compensation. However, in view of reduction in power consumption, a passive optical component such as a dispersion compensation optical fiber may frequently be utilized as a dispersion compensator. In such a case, it may be necessary to manufacture the dispersion compensator tailored for the optical fiber subject to compensation. However, the manufacturing of the dispersion compensator tailored for different types of the optical fibers may not be desirable in terms of cost. Thus, in general, a dispersion compensation menu includes discrete values of the compensation amount set at certain intervals so as to limit the selectability of the discrete values of the compensation amount. Accordingly, even if the value closest to the necessary compensation amount for the dispersion compensator is selected from the menu, the selected value includes an error of approximately half of the interval of the compensation amount. That is, a dispersion compensation result is likely to have both excessive and insufficient compensation parts.

FIG. 1 illustrates an example of the dispersion compensation result, and FIG. 2 illustrates an example of the compensation amount menu for the dispersion compensator, discrete values of which are set at 100 ps/nm intervals. In FIG. 1, N1 to N6 represent nodes, and lines connecting the adjacent nodes represent an optical fiber. Note that the lines between the adjacent nodes are hereinafter called spans. In FIG. 1, notations beneath the spans indicate a wavelength dispersion amount in the optical fiber (hereinafter called a "dispersion amount"), a compensating amount of the dispersion in the optical fiber (herein after called a "dispersion compensation amount"), and a (wavelength) dispersion amount in the optical fiber after the dispersion is compensated in the order from top to bottom. Further, in parentheses, "excessive compensation" is noted if the dispersion compensation amount is greater than the dispersion amount in the optical fiber, whereas "insufficient compensation" is noted if the dispersion amount in the optical fiber is greater than the dispersion compensation amount. For example, the dispersion amount in the optical fiber between the nodes N1 and N2 is 253 ps/nm, and the dispersion compensation amount closest to 253 ps/nm is 300 ps/nm in the dispersion compensation menu illustrated in FIG. 2. As a result, 47 ps/nm of the dispersion compensation amount indicates an excessive compensation amount.

Since the compensation amount menu is composed of the discrete values set at 100 ps/nm intervals, a compensation error of ±50 ps/nm is obtained. In,the recent typical network composed of optical fibers connected in a mesh configuration, the optical fibers having the insufficient dispersion compensation amounts and the optical fibers having the excessive compensation amounts may be randomly arranged.

Next, FIG. 3 illustrates an example of a network of nodes. As illustrated in FIG. 3, the network is composed of the nodes N1 to N7, and the notations beneath the spans connecting the adjacent nodes indicate the dispersion amount in the optical fiber (illustrated at the upper part) and the dispersion compensation amount (illustrated at the lower part).

FIG. 4 illustrates an example of an allowable range of accumulated dispersion. The allowable range may vary with the distance of the optical fiber, which is expressed by approximately equal spaced intervals and is therefore represented by the number of spans. FIG. 5 illustrates accumulated dispersion in the optical fiber at the endpoint of a path from an initial node to a terminal node. For example, if the initial node is the node N1 and the terminal node is the node N2, a value obtained by subtracting the dispersion compensation amount from the dispersion amount in the span of the optical fiber between the nodes N1 and N2, which is 5 ps/nm. In this case, since the number of spans between the nodes N1 and N2 is one, the allowable range of the accumulated dispersion corresponding to the number of spans being one is in a range of 70 ps/nm to −30 ps/nm as illustrated in FIG. 4. Accordingly, the 5 ps/nm obtained above falls within the allowable range, which indicates that the path from the node N1 to the node N2 may be capable of signal transmission or transmission capable. Likewise, if the initial node is the node N1 and the terminal node is the node N7, the number of spans between the adjacent nodes N1 and N2, N2 and N3, N3 and N4, N4 and N5, N5 and N6 and N6 and N7 constituting a path is six. Accordingly, the accumulated dispersion is 32 ps/nm, and the allowable range of the accumulated dispersion is in a range of 35 ps/nm to 5 ps/nm, which indicates that the path from the node N1 to the node N7 may be transmission capable.

However, if the initial node is the node N1 and the terminal node is the node N6, the accumulated dispersion is −3 ps/nm, and the allowable range of the accumulated dispersion is in a rage of 42 ps/nm to −2 ps/nm, which indicates that the accumulated dispersion of −3 ps/nm is not within the allowable range. As a result, the path from the node N1 to the node N6 may not be transmission capable.

This indicates that despite the fact that the path from the node N1 to the node N6 is incapable of signal transmission or transmission incapable, the path from the node N1 to the node N7, which is longer than the path from the node N1 to the node N6, is transmission capable.

FIG. 6 illustrates an example of a typical procedure for designing an arrangement of dispersion compensators. As illustrated in FIG. 6, the arrangement of dispersion compensators is generated in step S1, and whether all the optical paths are transmission capable is determined in step S2. If all the optical paths are transmission capable ("YES" in step S2), designing of the arrangement of the dispersion compensators is completed. However, if part of the optical paths are not transmission capable ("NO" in step S2), a regenerative repeater is added in the middle of the path that is transmission incapable (step S3).

FIG. 7 illustrates an example of another typical procedure for designing an arrangement of dispersion compensators. As illustrated in FIG. 7, an arrangement of dispersion compensators is generated in step S5, and whether all the optical paths are transmission capable is determined in step S6. If all the optical paths are transmission capable ("YES" in step S6), designing of the dispersion compensator arrangement is completed. However, if part of the optical paths are not transmission capable ("NO" in step S6), a process in step S5 is repeated after a constraint condition is added (step S7). Not that constraint condition is added for preventing the dispersion compensation amount of the transmission incapable optical path from being combined.

There is disclosed a wavelength dispersion compensation design technology for an arbitrary link including a plurality of spans extracted from the optical network and a plurality of nodes having the add/drop function (e.g., WO/2005/006604). In this technology, the wavelength dispersion compensation amount of the wavelength dispersion compensation device provided for each path is set so that all the residual dispersion range of the respective paths which have reached the respective nodes are within the allowable residual dispersion range set as the transmission enabled condition for all the paths of the link.

Further, there is disclosed an optical transmission network design technology to which a wavelength multiplexing transmission system is applied (e.g., Japanese Laid-open Patent Publication No. 2006-135788). In this technology, initial setup of the optical transmission network is inputted, and an arrangement pattern by which wavelength multiplexing variable dispersion compensators are arranged in the optical transmission network is obtained based on the setups. The sum of fixed dispersion values is obtained when a fixed dispersion compensator is replaced with the wavelength multiplexing variable dispersion compensator, and arrangement patterns are sorted in the order of priority based on an absolute value of the sum of the obtained fixed dispersion values.

Moreover, there is disclosed a network designing technology capable of obtaining the installation of a reproducing relay device optimal for a specific network while ensuring signal quality of a path inside a network (e.g., Japanese Laid-open Patent Publication No. 2006-42279). In this technology, a linear network is divided into a plurality of regenerating intervals each including nodes. In the regenerating intervals, regenerators are disposed in opposing ends, and devices such as an "n" optical amplifier, an OADM and the like are disposed for each of the nodes located in the regenerating intervals. In each of the regenerating intervals, a plurality of assumed paths obtained as a result of the arrangement are then extracted and the possibility of transmission is determined for each assumed path. The transmission possibility determination is displayed and reset by a user.

Patent Document 1: WO/2005/006604
Patent Document 2: Japanese Laid-open Patent Publication No. 2006-135788
Patent Document 3: Japanese Laid-open Patent Publication No. 2006-42279
Non-patent Document 1: "Optimization of Discrete Systems", published May, 2000, Morikita Shuppan, Co., Ltd.

When an arrangement of devices within a network is designed, the network is divided into a linear configuration or a ring configuration. The linear or ring configuration of the network is, called a segment. In general, the arrangement of the dispersion compensators is designed based on the procedures illustrated in FIGS. 6 and 7 while the segments are fixed.

According to the procedure illustrated in FIG. 6, if not all the paths are transmission capable, the regenerative repeater is simply added in the middle of the path that is transmission incapable regardless of the length of the path in question in step S3. Thus, in the examples illustrated in FIGS. 3 to 5, the path from the node N1 to the node N5 is transmission capable whereas the path from the node N1 to the node N6 is transmission incapable. Thus, even if the path from the node N1 to the node N7 is transmission capable, the regenerative repeater is automatically added to the node N5 to simply divide the path into a path from the node N1 to the node N5 and a path from the node N5 to the node N6. Therefore, the cost may be increased due to an increase in the number of regenerative repeaters.

Further, in the procedure of the example illustrated in FIG. 7, a constraint condition for preventing the dispersion compensation amount of the optical path that is transmission incapable in step S7 from being combined is added. However, at this time, the optical path that is transmission incapable is not classified based on the length of the optical path (i.e., based on whether the optical path is long or short). As a result, the restriction condition is added to the optical path from the node N1 to the node N6 despite the fact that the path from the node N1 to the node N7 is transmission capable. Thus, it may not be easy to modify the arrangement of the dispersion compensators in which a long optical path is transmission capable and a short optical path is transmission incapable.

In such a design of the dispersion compensator arrangement, even if the longer optical path is transmission capable, the shorter optical path may not always be transmission capable. Thus, in the operations of the network, the transmission of the optical path is tested regardless of the length of the optical path every time the optical path is used for signal transmission despite the fact that the longer optical path in the same network is capable of transmission. Accordingly, such a task is unnecessarily burdensome and liable to cause errors in the network operations.

In the procedures illustrated in FIGS. 6 and 7, segments are not taken into account. Thus, there is a possibility that the shorter optical path may not be transmission capable despite the fact that the longer optical path is transmission capable in bridging portions between the segments of the network. In this case, even if the longer optical path is transmission capable, the shorter optical path also needs to be tested whether it is transmission capable every time it is used in the bridging portions between the segments of the network in the network operations. Accordingly, such an unnecessarily burdensome task, which is also liable to cause errors, may need to be performed in the network operations.

SUMMARY

According to an aspect of an embodiment, a dispersion compensation design system includes a segment dividing unit configured to divide an optical network into a plurality of segments of a linear network or a ring networks; a path classifying unit configured to classify one of paths of the optical network, as a specific type path, the one of the paths being incapable of transmitting an optical signal by itself and contained in a longer one of the paths having a route longer than that of the one of the paths and capable of transmitting the optical signal; a segment reconfiguration unit configured to reconfigure the segments so as to maximize a number of the specific type paths; a dispersion compensation amount computing unit configured to compute a dispersion compensation amount in one of spans of the optical network so as to minimize the number of the specific type paths within the reconfigured segment; and an update unit configured to update the dispersion compensation amount in the one of the spans of the optical network with the computed dispersion compensation amount obtained by the dispersion compensation amount computing unit.

The object and advantages of the invention will be realized and attained by means of the elements and combinations particularly pointed out in the appended claims.

It is, to be understood that both the foregoing general description and the following detailed description are exemplary and explanatory and are not restrictive of the invention, as claimed.

Additional objects and advantages of the embodiments will be set forth in part in the description which follows, and in part will be obvious from the description, or may be learned by practice of the invention.

BRIEF DESCRIPTION OF THE DRAWINGS

FIG. 2 is a diagram illustrating an example of a dispersion compensation menu;

FIG. 4 is a diagram illustrating an example of an allowable range of accumulated dispersion;

FIG. 5 is a diagram illustrating an example of an allowable range of accumulated dispersion;

FIG. 16 is a flowchart illustrating an overall dispersion compensation design process according to a second embodiment;

DESCRIPTION OF EMBODIMENTS

In the following, a description is given, with reference to the accompanying drawings, of embodiments.

[Configuration of Dispersion Compensation Design System]

Figure 1:
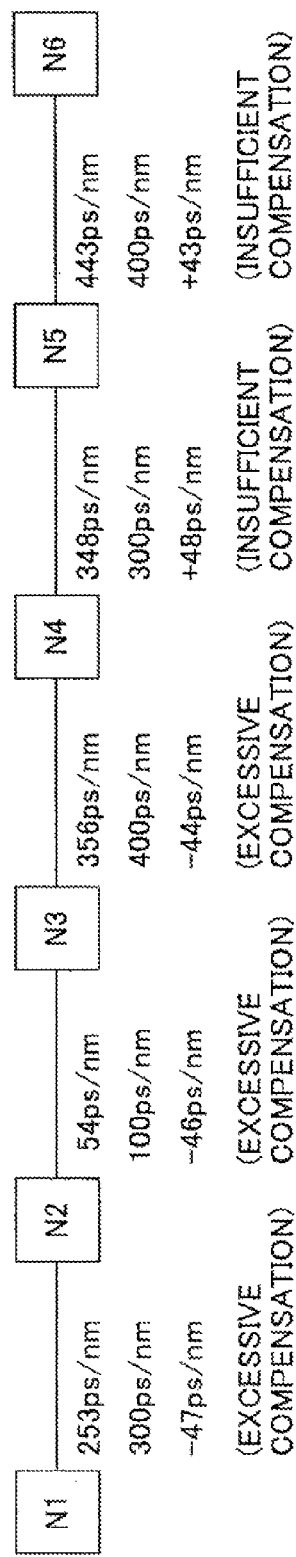
FIG. 1 is a diagram illustrating an example of a dispersion compensation result.
Figure 3:
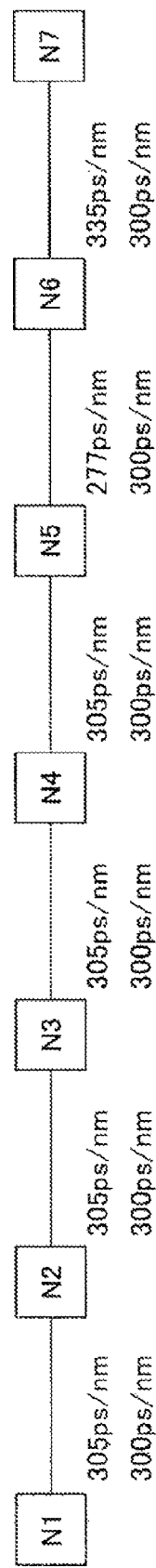
FIG. 3 is a diagram illustrating an example of an optical network of seven nodes.
Figure 6:
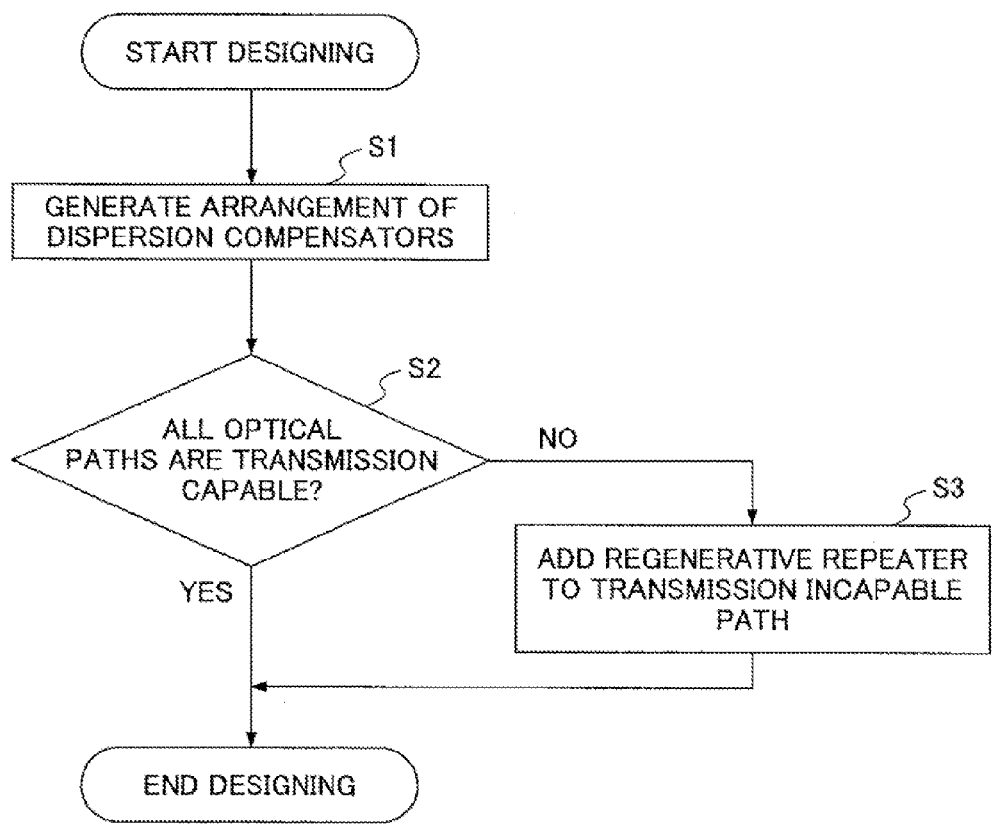
FIG. 6 is a diagram illustrating an example of the related art procedure in designing an arrangement of dispersion compensators.
Figure 7:
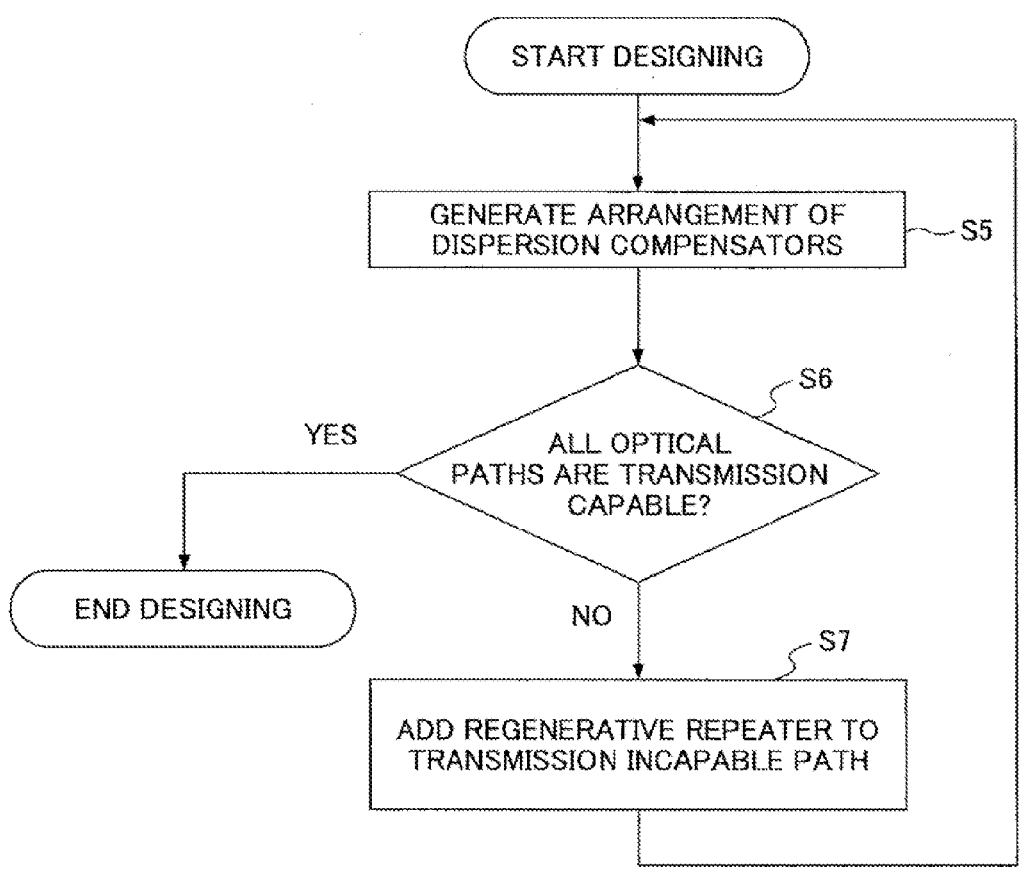
FIG. 7 is a diagram illustrating another example of the related art procedure in designing the arrangement of dispersion compensators.
Figure 8:
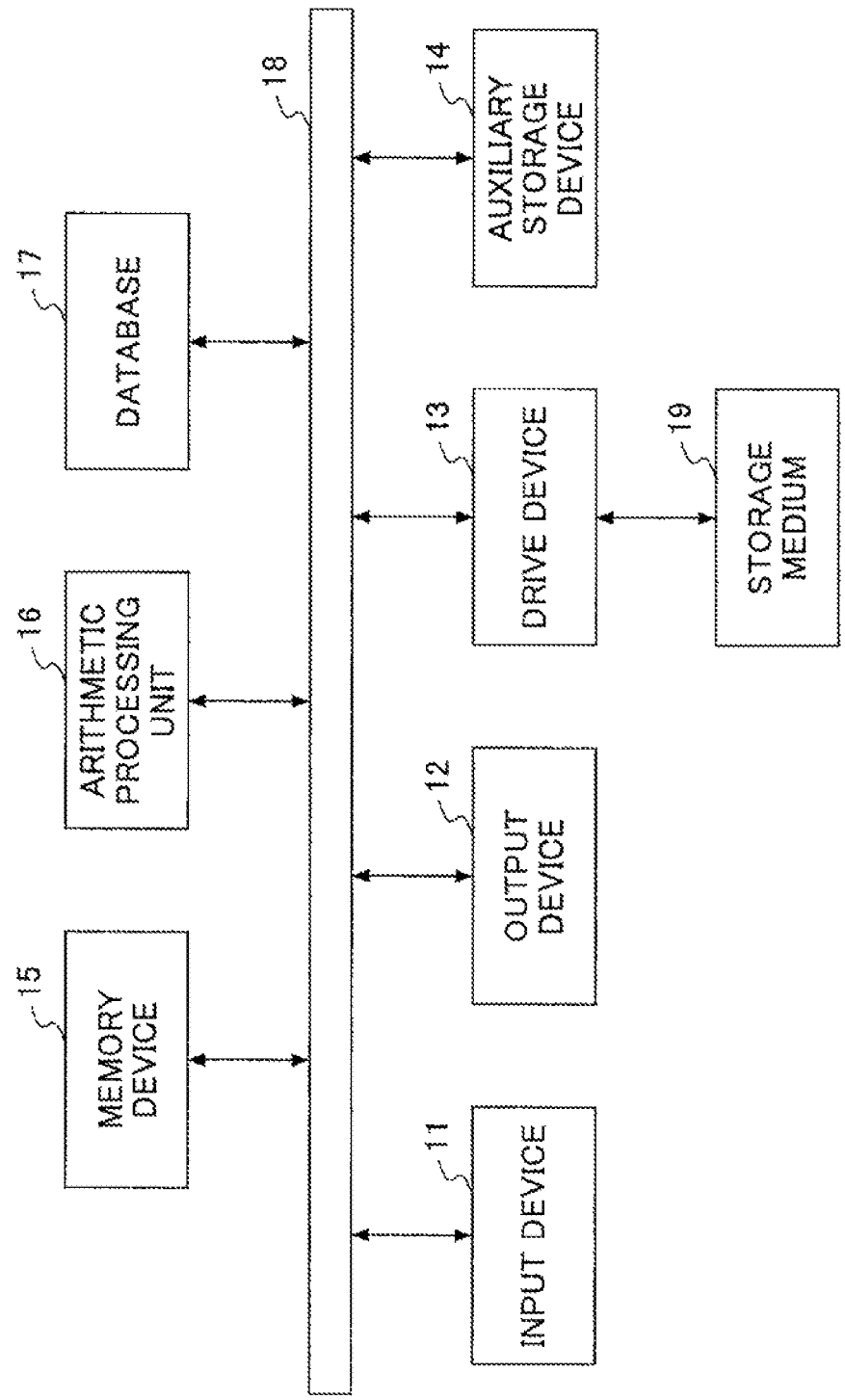
FIG. 8 is a hardware configuration diagram illustrating a dispersion compensation design system according to an embodiment.

FIG. 8 is a configuration diagram of a dispersion compensation design system according to an embodiment. As illustrated in FIG. 8, the dispersion compensation design system includes an input device 11, an output device 12, a drive device 13, an auxiliary storage device 14, a memory device 15, an arithmetic processing unit 16 and a database device 17 that are connected via a system bus 18. The dispersion compensation design system may be applied to a special-purpose configuration; however, the dispersion compensation design system may also be applied to a general-purpose configuration such as a personal computer or a workstation.

The input device 11 includes a keyboard and a mouse via which a user inputs various data. The output device 12 includes a display configured to display various windows and data necessary for running programs of the dispersion compensation design system. The output device 12 displays the windows and data based on the executed programs. The programs to be executed may be distributed via a recording medium 19 such as a CD-ROM. When the recording medium 19 recording the programs to be executed is placed in the drive device 13, the programs stored in the recording medium 19 are installed in the memory device 15 via the drive device 13.

The arithmetic processing unit 16 is configured to control an entire process of the dispersion compensation design system including various arithmetic processes and the later-described various processes based on the executed programs retrieved from the memory device 15. Further, the various information necessary for the programs in execution may be acquired from the database 17 or stored in the database 17.

[Flowchart of Dispersion Compensation Design Process According to First Embodiment]

Figure 9:
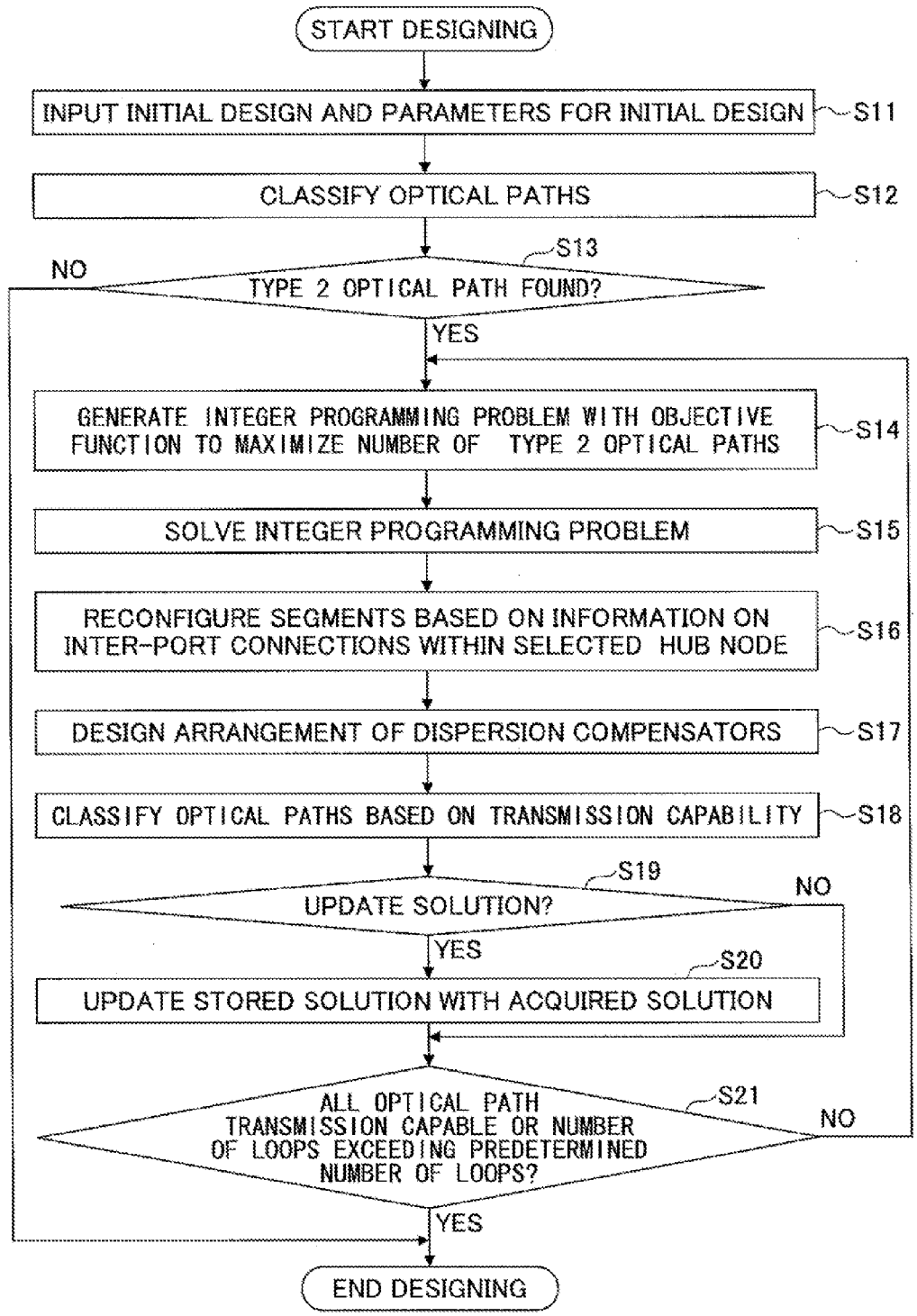
FIG. 9 is a flowchart illustrating an overall dispersion compensation design process according to a first embodiment.

FIG. 9 is a flowchart illustrating an overall dispersion compensation design process according to a first embodiment. In FIG. 9, an initial optical network design and parameters for the initial optical network design are input in step S11. In this example, the optical network is assumed to be a mesh network. The mesh network includes a network formed by mutually connecting ring networks. In this case, it may not be possible to design the dispersion compensation in the mesh network with the originally arranged dispersion compensators, the mesh network is divided into segments such as a linear network or a ring network. Thus, the optical network is divided into linear configuration or ring configuration segments in the initial optical network design in step S11.

Figure 10:
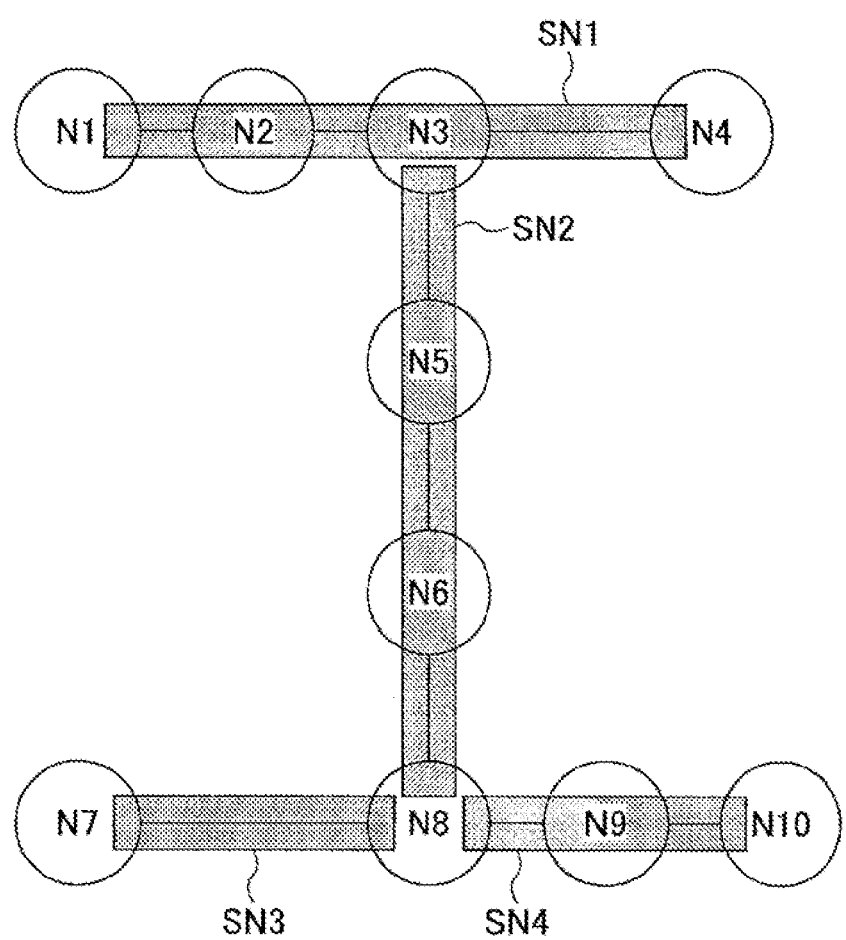
FIG. 10 is a diagram illustrating segments of the optical network of the nodes.

FIG. 10 is a diagram illustrating segments of the network. In FIG. 10, N1 to N10 represent nodes, lines connecting the adjacent nodes represent spans, SN1 to SN4 represent the segments. The node is also called a "site". Among the nodes in the optical network, the node that links with three or more adjacent nodes or the node that includes three or more spans is called a "hub node" or a "hub site". In FIG. 10, the node N3 and the node N8 are the hub nodes. The optical network is divided into any segments in the initial optical network design. The segment SN1 is composed of a linear network connecting spans N1-N2, N2-N3, N2-N3 and N3-N4. The segment SN2 is composed of a linear network connecting spans N3-N5, N5-N6, and N6-N8. The segment SN3 is composed of a linear network connecting spans N7-N8. The segment SN4 is composed of a linear network connecting spans N8-N9 and N9-N10. Note that the segment configuration illustrated in FIG. 10 is only an example, and other segment configurations may be set in the initial optical network design.

Further, in step S11, the following informational items are input for each of the segments; that is, the nodes constituting the optical network and the connection between the nodes, an optical transmission path corresponding to a distance of the optical fiber, an initial node and a terminal node, dispersion amounts, the nodes aligned in the order from the start point to the end point of the path, a target value of the accumulated dispersion amount and an allowable range of the dispersion amount, an initial arrangement result of the dispersion compensators and transmission capable information or transmission incapable information of each of the paths. Specifically, an initial arrangement of the dispersion compensators is designed for each of the segments and the designed arrangement results of the compensators are stored in the memory device 15. If the designed arrangement results of the compensators are not reflected in some of the compensators, the amounts of the dispersion compensation are adjusted in the unreflected compensators.

In step S12, the optical paths are classified based on information on transmission capability and transmission incapability of the path and a route of the path in the initial design. The optical paths in this example are classified by three types. A type 1 optical path is capable of transmitting an optical signal by its self and all the optical paths contained in the type 1 optical path are capable of transmitting the optical signal. A type 2 optical path is incapable of transmitting an optical signal by itself and is contained in an optical path capable of transmitting the optical signal having a route longer than the route of the type 2 optical path. A type 3 optical path is those other than the type 1 optical path and the type 2 optical path.

Figure 11:
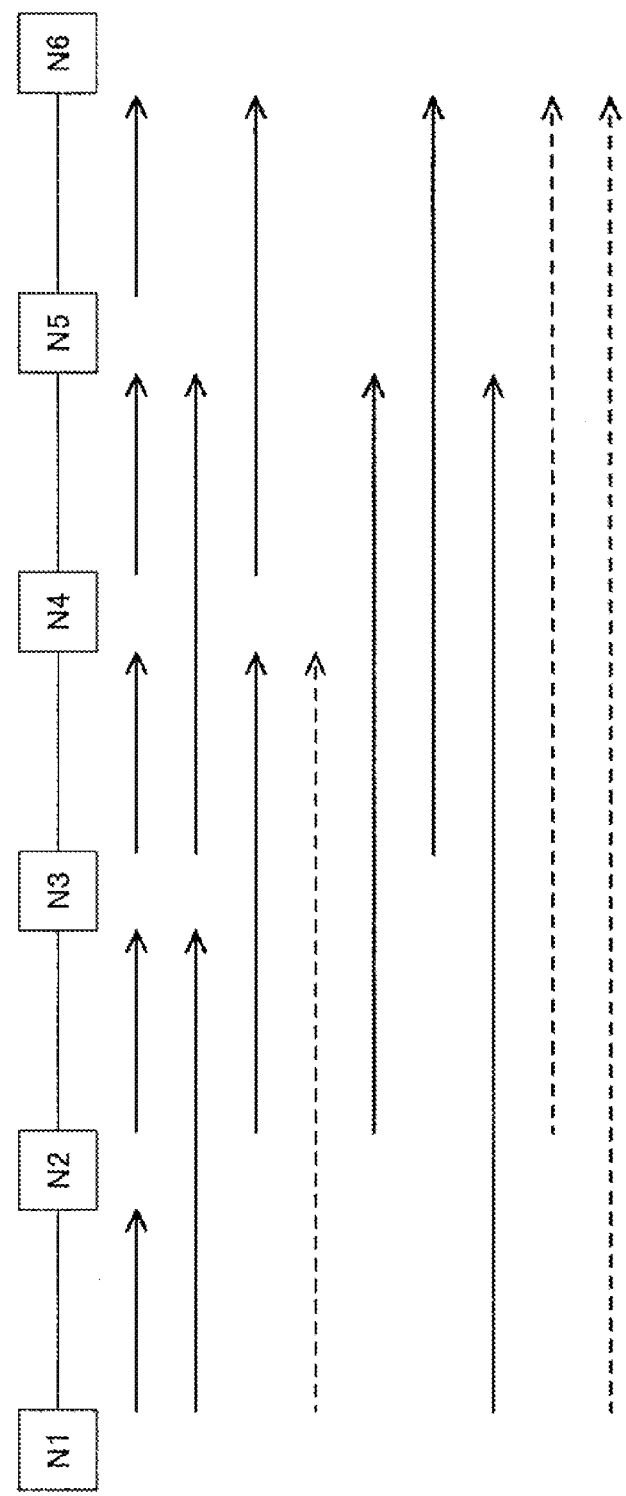
FIG. 11 is a diagram illustrating different types of optical paths.

FIG. 11 is a diagram illustrating classification of the optical paths (i.e., different types of optical paths). In FIG. 11, N1 to N6 represent nodes, and lines connecting the adjacent nodes represent the spans. Horizontally directed arrows indicate paths, of which solid line arrows represent transmission capable paths and broken line arrows represent transmission incapable paths. For example, the path from the node N1 to the node N3 is depicted by a solid line arrow, and hence, the path from the node N1 to the node N3 is a transmission capable path. The route of the path is in the order of N1, N2 and N3. The optical paths, the entire routes of which are contained in the optical path from the node N1 to the node N3 other than the path from the node N1 to the node N3, are the path from the node N1 to the node N2 and the path from the node N2 to the node N3. These two paths (i.e., optical paths N1-N2 and N2-N3) are transmission capable and satisfy a type 1 optical path condition. Hence, the two paths (N1-N2 and N2-N3) are both classified as the type 1 optical path.

The optical path between the adjacent nodes, such as the path between the nodes N1 and N2, does not contain the entire route of its own, the path between the adjacent nodes that is transmission capable is classified as the type 1 optical path. Accordingly, the type 1 optical path corresponds to the paths between the nodes N1-N2, N2-N3, N3-N4, N4-N5, N5-N6, N1-N3, N2-N4, N3-N5, N4-N6, N2-N5 and N3-N6.

Next, the path from the node N1 to the node N4 is depicted by a broken line arrow, and hence, the path from the node N1 to the node N4 is a transmission incapable path. The paths that include a route longer than the entire route of the path from the node N1 to the node N4 are the path from the node N1 to the node N5 and the path from the node N1 to the node N6. Of these, the path from the node N1 to the node N6 is the transmission incapable path represented by the broken line arrow, and the path from the node N1 to the node N5 is the transmission capable path represented by the solid line arrow. The path from the node N1 to the node N4 is transmission incapable and is contained in the path from the node N1 to the node N5, and the path from the node N1 to the node N5 is transmission capable and is longer than the path from the node N1 to the node N4. Therefore, the path from the node N1 to the node N4 is classified as the type 2 optical path. In FIG. 11, the type 2 optical path is only the path from the node N1 to the node N4. Thus, the remaining paths N1-N5, N2-N6 and N1-N6 that neither correspond to the type 1 optical path nor the type 2 optical path are classified as the type 3 optical path. In this example, the type 2 optical path is what is focused on, and the number of the type 2 optical paths is counted.

Figure 12:
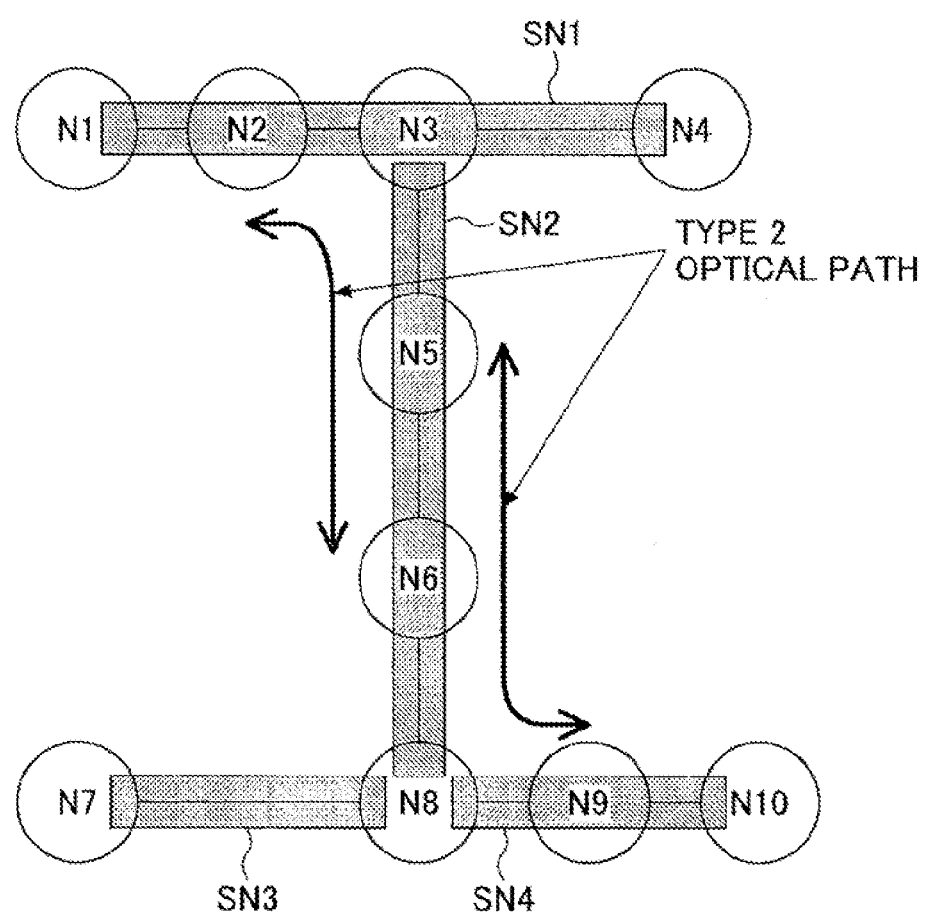
FIG. 12 is a diagram illustrating an example of a type 2 optical path present in a bridging portion between the segments in an optical network.

FIG. 12 is a diagram illustrating an example of the type 2 optical path present in bridging portions between the segments of the network. FIG. 11 illustrates the type 2 optical path within a segment; however, the type 2 optical path may exist that is present within the bridging portions between the segments of the network. For example, if the path from the node N2 to the node N6 is transmission incapable and the path from the node N1 to the node N10 is transmission capable, the path from the node N2 to the node N6 is classified as the type 2 optical path. Further, if the path from the node N5 to the node N9 is transmission incapable and the path from the node N1 to the node N10 is transmission capable, the path from the node N2 to the node N6 is classified as the type 2 optical path.

In step S13 of FIG. 9, whether a type 2 optical path exists is determined. If there is no type 2 optical path, the design of the arrangement of the dispersion compensators is completed, and the values for the initial design are acquired as the design result. If the type 2 optical path exists, the process in step S14 is processed.

In step S14, a mixed integer programming problem that includes an objective function to maximize the number of the type 2 optical paths is generated. The objective function and the constraint conditions of the mixed integer programming problem are expressed by the following equations (1) to (4).

Objective Function:

$$\max \sum_{d \in Class2d} V(d) \quad (1)$$

Constraint Condition:

$$\sum_{\forall from \in NextNodes(n)} NCV(n, (from, np)) <= 1 \quad \begin{array}{l}(\forall n \in NetworkNodes) \\ (\forall np \in NextNodes(n))\end{array} \quad (2)$$

$$\sum_{\substack{(from, to) \\ \in Links(n)}} NCV(n, (from, to)) = NCVNum(n) \quad (\forall n \in NetworkNodes) \quad (3)$$

$$\sum_{\substack{(n,(from, to)) \\ \in PathRoute(d)}} NCV(n, (from, to)) - ConNum(d) \times V(d) >= 0 \quad (\forall d \in Class2d) \quad (4)$$

In the equations (1) to (4), "n", "np", "from" and "to" represent nodes, in which the "from" and "to" specifically represent nodes adjacent to the hub node n. Further, "d" represents the type 2 optical path. "NetworkNodes" represents a group of all the nodes within the optical network. "NextNodes(n)" represents a group of nodes adjacent to the hub node n. "Class2d" represents a group of all the type 2 optical paths within the optical network. "Links(n)" represents a group of inter-port connections within the hub node when the segments are configured. Note that the "inter-port connections within the hub node" indicates the connections between ports of nodes adjacent to the hub node via the hub node. That is, the "Links(n)" represents a group of connectable combinations of "from" nodes and "to" nodes present within the hub node n. "PathRoute" represents a group of the inter-port connections within the hub node included in the type 2 optical path. "NCVNum(n)" represents the number of allowable inter-port connections within the hub node n when the segments are configured. Note that if the number of nodes adjacent to the hub node n is "m", and the "m" is an odd number, NCVNum(n)=(m−1)/2. If the number of nodes adjacent to the hub node n is "m", and the "m" is an even number, NCVNum(n)=m/2. "ConNum(d)" represents the number of intermediate hub nodes contained in the type 2 optical path. "V(d)" represents whether the segment is capable or incapable of including the type 2 optical path d. If the segment is capable of including the type 2 optical path d, V(d)=1, whereas if the segment is incapable of including the type 2 optical path d, V(d)=0. "NCV(n, (from, to))" represents whether to use the inter-port connections that connect the adjacent nodes (from, to) within the hub node n when the segments are configured. If the segment is capable of using the inter-port connections, NCV(n, (from, to))=1, whereas if the segment is incapable of using the inter-port connections, NCV(n, (from, to))=0.

The objective function expressed by the above equation (1) represents the sum of type 2 optical paths. The objective function is configured to maximize the number of type 2 optical paths. Accordingly, the inter-port connections within the hub node is selected such that the segment includes the maximum number of type 2 optical paths.

The constraint condition expressed by the equation (2) indicates that a port overlapped with that of the adjacent node is not selected in the hub node n. In this example, the optical network is assumed to have only one type of the dispersion compensator corresponding to one span. In the optical network having this configuration, the adjacent nodes are not allowed to have a port that is overlapped with the port of the hub node.

Figure 13A:
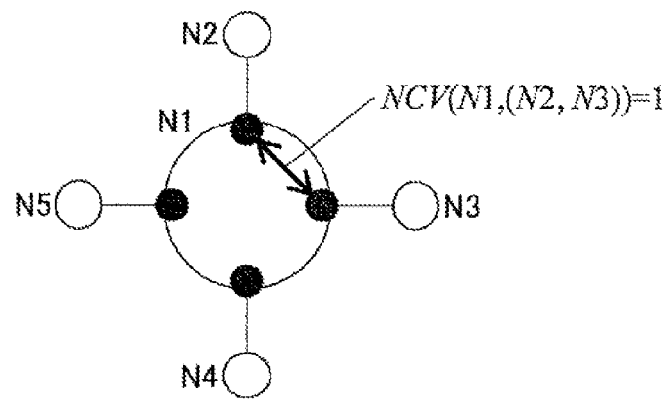
FIGS. 13A, 13B and 13C are diagrams illustrating an intra-hub port connection.
Figure 13B:
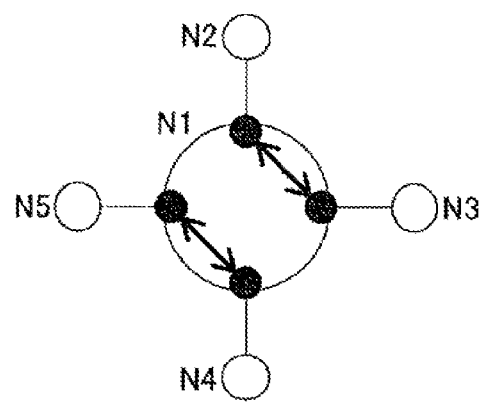
Figure 13C:
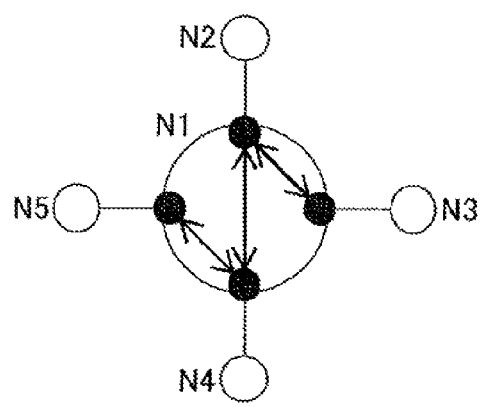

FIGS. 13A to 13C are diagrams illustrating the inter-port connections within the hub node. As illustrated in FIG. 13A, the hub node N1 includes the adjacent nodes N2 to N5. If the hub node N1 includes ports that connect the adjacent nodes (N2, N3), NCV(N1, (N2, N3))=1. As illustrated in FIG. 13B, the hub node N1 further includes ports that connect the adjacent nodes (N4, N5). However, if the ports of the hub node N1 have attempted to connect the adjacent nodes (N2, N4), the overlapped ports are selected as illustrated in FIG. 13C, which is not allowed in the hub node N1. The constraint condition expressed by the equation (2) indicates a condition in which the port overlapped with that of the adjacent node is restricted from being selected in the hub node as illustrated in FIG. 13C.

The constraint condition expressed by the equation (3) indicates a condition in which the number of inter-port connections that connect the adjacent nodes within the hub node is equal to the number of allowable inter-port connections within the hub node. The number of settable inter-port connections within the hub node may be restricted based on the constraint condition expressed by the equation (2). Since the hub node N1 illustrated in FIG. 13A includes four ports that connect the nodes adjacent to the hub node N1, the number of inter-port connections is represented by "NCVNum(N1)=4/2=2". Thus, the number of inter-port connections that connect the adjacent nodes within the hub node N1 is preferably equal to 2. The constraint condition expressed by the equation (3) is not mandatory; however, the computing time may be reduced based on the constraint condition expressed by the equation (3).

The constraint condition expressed by the equation (4) indicates a condition in which the segment may include the type 2 optical path if the inter-port connections that connect the adjacent nodes within each of the hub nodes necessary for containing the type 2 optical path are selected. The constraint condition expressed by the equation (4) indicates that the inter-port connections that connect the adjacent nodes within each of the hub nodes, through which the type 2 optical path passes, are set such that the inter-port connections that connect the adjacent nodes within the hub node are along the type 2 optical path. For example, if the path from the node N2 to the node N6 is defined as the path d, the hub node contained in the type 2 optical path d corresponds to only the hub node N3. Accordingly, "ConNum(d)=1" is satisfied. Accordingly, if the inter-port connections that connect the adjacent nodes (N2, N5) within the hub node N3 are selected, the segment may include the path d from the node N2 to the node N6. That is, if NCV(N3, (N2, N4))=1, V(d)=1. Accordingly, the constraint condition expressed by the equation (4) is satisfied.

In step S15 of FIG. 9, the mixed integer programming problem with the object function expressed by the equation (1) is solved by utilizing at least one of the constraint conditions expressed by (2) to (4). In the mixed integer programming problem, the "V(d)" and "NCV(n, (from, to))" are variables (i.e., parameters) for the design target. The mixed integer programming problem is solved by applying the appropriate solutions to the variables in the constraint conditions expressed by the equations (2) to (4). The method of solving the mixed integer programming is generally known in the art, an example of which is disclosed by Non-patent Document 1 or the like.

In step S16, the segments are reconfigured based on the information on the inter-port connections within the selected hub node represented by "NCV(n, (from, to))". The reconfiguration of the segments indicates changing the configuration of the segments utilized for designing the arrangement of the dispersion compensators.

Figure 14:
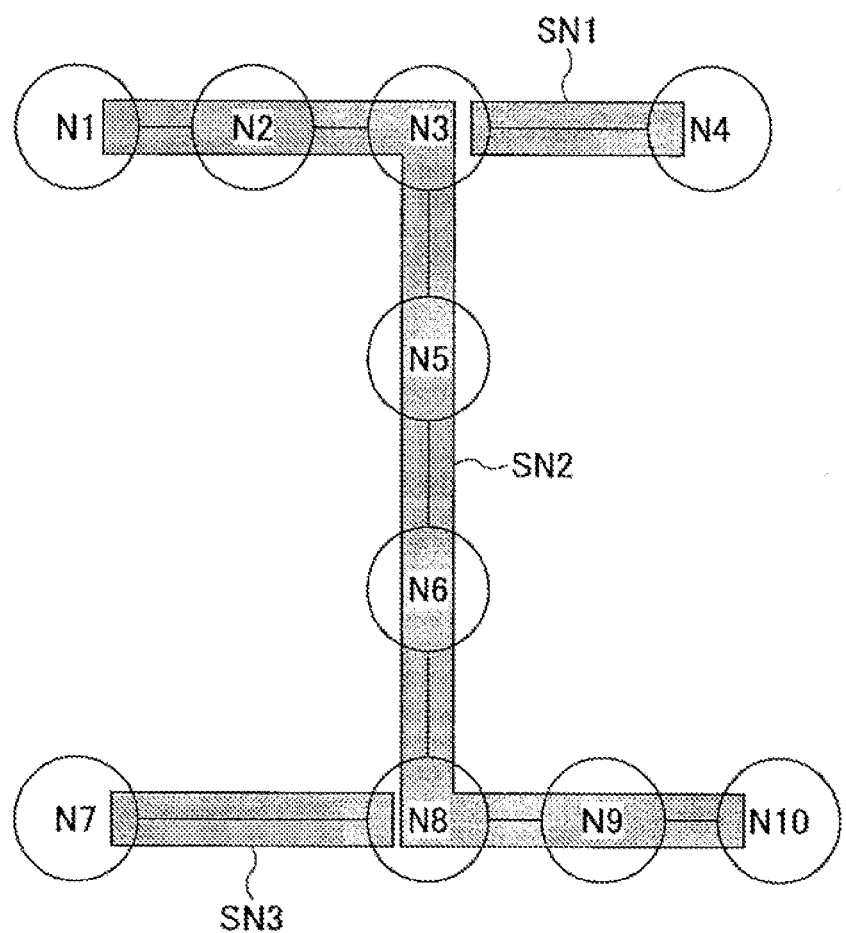
FIG. 14 is a diagram illustrating an example of the optical network in FIG. 12 including reconfigured segment.

FIG. 14 is a diagram illustrating an example of the optical network in FIG. 12 including reconfigured segment. As illustrated in FIG. 14, since the optical network is divided into segments such that the segments include the maximum number of the type 2 optical paths, the optical paths N1-N2, N2-N3, N3-N5, N5-N6, N6-N8, N8-N9 and N9-N10 are reconfigured as one segment SN2 when the segments are reconfigured. Further, the optical path N3-N4 is reconfigured as the segment SN1 and the optical path N7-N8 is reconfigured as the segment SN3.

Figure 15A:
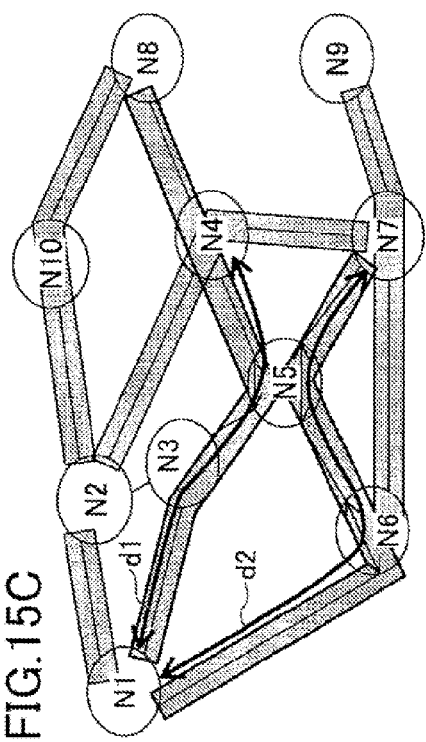
FIGS. 15A, 15B and 15C are diagrams illustrating other examples of the optical network in which the segments are reconfigured.
Figure 15B:
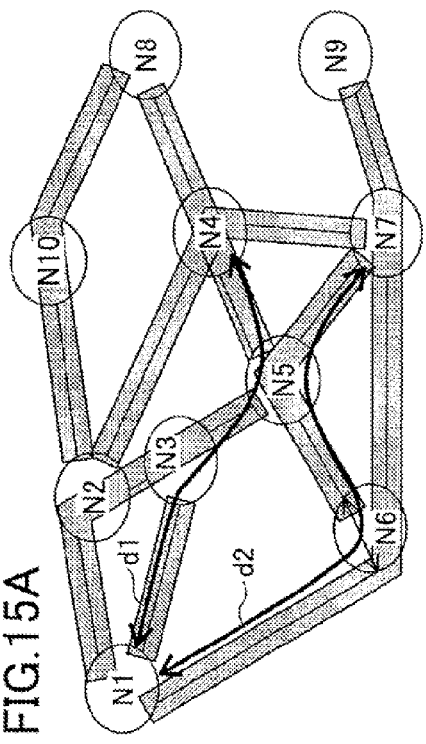
Figure 15C:
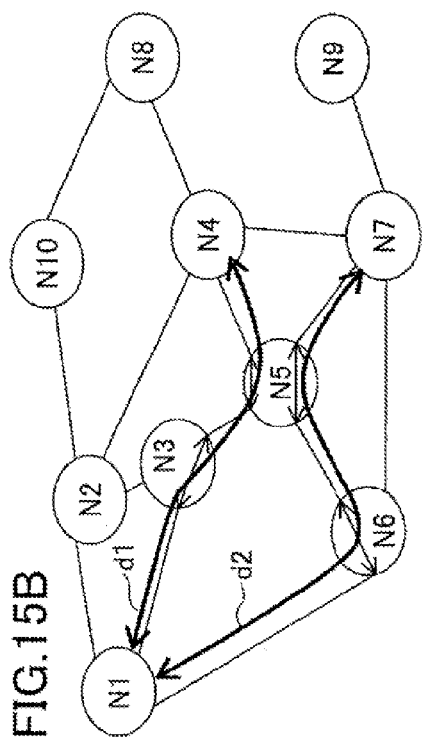

FIGS. 15A, 15B and 15C are diagrams illustrating other examples of the optical network including rearranged segments. FIG. 15A illustrates a segment configuration of the initial optical network design. The initial optical network design includes the type 2 optical paths d1 and d2 present in bridging portions between the segments. Thus, the mixed integer programming problem is constructed for allowing the type 2 optical paths d1 and d2 to be contained within the corresponding segments such that the inter-port connections within the hub node are selected based on the aforementioned objective function and constraint conditions.

Next, the mixed integer programming problem is solved. Since the optical network illustrated in FIG. 15A only includes the type 2 optical paths d1 and d2, the mixed integer programming problem is solved by selecting the inter-port connections along the respective routes of the optical paths d1 and d2 via the two hub nodes as illustrated in FIG. 15B.

That is, the number of intermediate hub nodes contained in the optical path d1 is computed as "ConNum(d1)=2". Accordingly, if "NCV(N3, (N1, N5))=1", and "NCV(N5, (N3, N4))=1", "V(d1)=1" is acquired, which indicates that the constraint condition expressed by the equation (4) is satisfied. Likewise, the number of intermediate hub nodes contained in the optical path d2 is computed as "ConNum(d2)=2". Accordingly, if "NCV(N6 (N1, N5))=1", and "NCV(N5, (N6, N7))=1", "V(d2)=1" is acquired, which indicates that the constraint condition expressed by the equation (4) is satisfied. Further, "NCV(N5, (N6, N4)=0" is acquired based on the constraint condition expressed by the equation (2) or (3). Accordingly, information on the inter-port connections illustrated in FIG. 15B is acquired, and hence, the segments are reconfigured as illustrated in FIG. 15C based on the acquired information on the inter-port connections. The type 2 optical paths d1 and d2 may be eliminated based on the dispersion compensation design (i.e., the design of the arrangement of the dispersion compensators) within the segments as described below.

In step S17 of FIG. 9, the arrangement of the dispersion compensators within the corresponding segment is designed such that the number of the type 2 optical paths is minimized within the segment. For example, the mixed integer programming problem is generated for designing the arrangement of the dispersion compensators so as to minimize the dispersion compensation error in each of the optical paths. The objective function and the constraint conditions of the mixed integer programming problem are expressed by the following equations (5) to (8).

Objective Function:

$$\text{Minimize} \sum_i (negError[G_i] + posError[G_i]) \quad (5)$$

Constraint Condition:

$$\sum_t I_{dcm}[l, t] \cdot s[t] = 1 \quad \text{for } \forall l \quad (6)$$

$$\left\{ D(G) + \sum_t (I_t[G, t] \cdot DCM_{val}[t] \cdot s[t]) \right\} - negError[G] \leq rdTarget[G] \quad (\text{for } \forall G) \quad (7)$$

$$\left\{ D(G) + \sum_t (I_t[G, t] \cdot DCM_{val}[t] \cdot s[t]) \right\} + posError[G] \geq rdTarget[G] \quad (\text{for } \forall G) \quad (8)$$

In the above equations, negError[Gi] represents a compensation error when the result of (the accumulated dispersion value of the path Gi—the accumulated dispersion target value of the path Gi) is negative, and posError[Gi] represents a compensation error when the result of (the accumulated dispersion value of the path Gi—the accumulated dispersion target value of the path Gi) is positive. If the dispersion compensation menu t is a dispersion compensation candidate of the span 1, $I_{dcm}$[l, t]=1, otherwise $I_{dcm}$[l, t]=0. s[t] indicates whether the dispersion compensation menu t is selected. If the dispersion compensation menu t is selected, s [t]=1. D(G) represents the sum of the dispersion amount from the start point to the end point of the path G. Further, if the dispersion compensation menu t is a dispersion compensation candidate of the path G, $I_t$ [G, t]=1, otherwise $I_t$[G, t]=0. $DCM_{val}$[t] represents a dispersion compensation amount of the dispersion compensation menu t. Further, rdTarget[G] represents the accumulated dispersion target value of the path G.

The above objective function expressed by the equation (5) is configured to compute the sum of the error between the accumulated dispersion value and the accumulated dispersion target value at the end point of each of the paths and minimize the sum of the errors. The constraint condition expressed by the equation (6) indicates that one dispersion compensator selected based on the dispersion compensation menu is arranged in each of the nodes. The equations (7) and (8) are a paired equation. In the paired equation, the first item in each brace (corresponding to the first left-hand side item) represents the accumulated dispersion amount from the start point to the end point of the path, and the second item in the brace represents the sum of the dispersion amount from the start point to the end point of the path. In the equations (7) and (8), the dispersion compensation amount is expressed by a reversed notation of the dispersion amount in the optical fiber. The accumulated dispersion value after the dispersion compensation is applied is obtained by the sum of the dispersion amount and the dispersion compensation amount. In equations (7) and (8), the second left-hand side item represents a variable of the dispersion compensation error, the right-had side item represents the accumulated dispersion target value at the end point of each path, which is input in step S11 where the initial design and the parameters for the initial design are input.

Next, the aforementioned mixed integer programming problem is solved. The method for solving the mixed integer programming is generally known in the art, an example of which is disclosed by Non-patent Document 1 or the like.

Next, whether each path is transmission capable is determined in step S18. The transmission capability is determined based on whether the accumulated dispersion amount at the end point of each path falls within the allowable range of the accumulated dispersion amount. If the accumulated dispersion amount falls within the allowable range of the accumulated dispersion amount, the optical path is determined as transmission capable. If, on the other hand, the accumulated dispersion amount does not fall within the allowable range of the accumulated dispersion amount, the optical path is determined as transmission incapable. Further, the optical paths are classified in step S18. In the classification in step S18, the optical paths are classified in the same manner as classified in the initial design based on information on transmission capability and transmission incapability of the path and a route of the path. Thereafter, the number of the type 2 optical paths is counted. If no type 2 optical path exists, the design of the arrangement of the dispersion compensators is completed. Then, the design result is stored in the memory device 15, and the dispersion compensation amount of each of the spans is updated.

Even if the segment reconfiguration and the design of the arrangement of the dispersion compensators is applied within each segment, there may be a type 2 optical path. In such a case, the aforementioned dispersion compensation design (i.e., the design of the arrangement of the dispersion compensators) is repeatedly carried out so as to acquire a design result in which the number of type 2 optical paths is minimized, and employ the design result which minimizes the number of the type 2 optical paths. For example, steps S19 to S21 illustrated below may be carried out.

In step S19, it is-determined whether to update the solution of the design result by comparing the number of type 2 optical paths before reconfiguration of the segments with the number of type 2 optical paths obtained as a design result after reconfiguration of the segments. If the number of type 2 optical paths obtained as the design result after reconfiguration of the segments is less than the number of type 2 optical paths which exists before reconfiguration of the segments, the solution stored in the memory device 15 is updated with a newly acquired solution of the design result in step S20. The newly acquired solution may be stored, for example, in the memory device 15 in the form of the variable obtained as the arrangement result of the dispersion compensators or as the solution of the mixed integer programming problem. At this time, the number of the type 2 optical paths in the newly acquired solution may also be stored in the memory device 15. Note that the initial value of the stored solution may be set as the initial design value. Alternatively, the initially acquired solution may constantly be updated every time the solution is acquired without setting the initial value.

Next, whether all the optical paths are transmission capable is determined or whether the number of loops exceeds a predetermined number of loops; that is, whether the number of times the arrangement of the dispersion compensators is generated exceeds a predetermined number of times is determined in step S21. If there is no solution, with which all the optical paths become transmission capable, the loop is terminated after the predetermined number of loops is repeated. The predetermined number of loops may be set in advance in a range of a few to several tens of loops. If all the optical paths are transmission capable, or if the number of loops exceeds the predetermined number of loops, the design of the arrangement of the dispersion compensators is completed and the solution stored at that time is determined as the design result. If part of the optical paths are transmission incapable, or if the number of loops is less than the predetermined number of loops, the process in step S14 is repeated.

With this configuration, the design result of the smallest possible number of type 2 optical paths incapable of transmitting an optical signal by itself and contained in an optical path capable of transmitting the optical signal having a route longer than the route of the type 2 optical path, may be acquired, which may reduce burdensome operational tasks and decrease operational errors.

Further, reconfiguration of the segments may provide the design result in which the smallest possible number of type 2 optical paths is present in the bridging portions between the segments of the network.

[Flowchart of Dispersion Compensation Design Process According to Second Embodiment]

The above-described dispersion compensation design process according to the first embodiment has illustrated the example in which the compensation amounts of the compensators are determined based on the mixed integer programming. However, the compensation amounts of the compensators may be determined based on another method other than the mixed integer programming. In the dispersion compensation design process according to a second embodiment, all the combinations of the inter-port connections within each of the hub nodes is computed, the number of type 2 optical paths within (via) each of the hub nodes is computed, and the combinations of the inter-port connections with which the smallest possible number of the type 2 optical paths are obtained are computed.

FIG. 16 is a flowchart illustrating an overall dispersion compensation design process according to a second embodiment. As illustrated in FIG. 16, step S11 for inputting the initial design and the design parameters, step S12 for classifying types of the optical paths, and step S13 for identifying the type 2 optical paths may be processed in the same manner as those illustrated in the flowchart of FIG. 9.

Step S101 is a loop process carried out on the type 2 optical paths classified in steps S12 and S18, which is repeated the number of times corresponding to the number of the type 2 optical types. In step S101, information on the hub node via which the type 2 optical path passes and inter-port connections within a the hub node is stored for each of the type 2 optical paths.

Steps S102 to S105 subsequent to step S101 form a loop process, in which the number of combinations of the inter-port connections within each of the hub nodes in the optical network are computed and the loop process is repeated corresponding to the computed number of combinations of the connections. In Step S102, combinations of the inter-port connections within each of the hub nodes in the optical network are computed, and the number of the type 2 optical paths is counted when one of the combinations of the inter-port connections within each hub node is selected. In step S103, whether the counted number of the type 2 optical paths is the maximum number of the type 2 optical paths stored in the memory device is determined. If the counted number equals the maximum number, the information on the current combinations of the inter-port connections within the hub node and the number of the type 2 optical paths are stored in step S104. If, on the other hand, the counted number is not equal to the maximum number, a next combination of the inter-port connections is selected in step S105 and the process in step S102 is carried out again.

If the number of the type 2 optical paths for all the combinations of the inter-port connections has been counted, the currently stored information on the inter-port connections within the hub node is applied to the design of the arrangement of the dispersion compensators in step S106.

Thereafter, In step S17 of FIG. 16, the arrangement of the dispersion compensators within the corresponding segment is designed such that the number of the type 2 optical paths is minimized within the segment similar to step S16 to S21 of the flowchart illustrated in FIG. 9.

Note that in the dispersion compensation design process according to the second embodiment, if there are the hub nodes Hub1, Hub2, . . . , and Hubx, the number of combination patterns (the number of combinations of inter-port connections within hub1*the number of combinations of inter-port connections within hub2* . . . *the number of combinations of inter-port connections within hubx) may need to be computed. Thus, if the number of hub nodes is large, the dispersion compensation design process according to the first embodiment may compute the design result faster than the dispersion compensation design process according to the second embodiment.

According to the aforementioned embodiments, burdensome operational tasks may be reduced and operational errors may also be decreased.

The embodiments described so far are not limited thereto. Various modifications or alterations may be made within the scope of the inventions described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A dispersion compensation design system, comprising:
    a segment dividing unit configured to divide an optical network into a plurality of segments of a linear network or a ring network;
    a path classifying unit configured to classify one of paths of the optical network, as a specific type path, the one of the paths being incapable of transmitting an optical signal by itself and contained in a longer one of the paths having a route longer than that of the one of the paths and capable of transmitting the optical signal;
    a segment reconfiguration unit configured to reconfigure the segments so as to maximize a number of the specific type paths;
    a dispersion compensation amount computing unit configured to compute a dispersion compensation amount in one of spans of the optical network so as to minimize the number of the specific type paths within the reconfigured segment; and
    an update unit configured to update the dispersion compensation amount in the one of the spans of the optical network with the computed dispersion compensation amount obtained by the dispersion compensation amount computing unit.

2. The dispersion compensation design system as claimed in claim 1, further comprising:
    a repeating unit configured to repeat the classification of the path, the reconfiguration of the segments and the computation of the dispersion compensation amount, the classification of the path being performed by the path classifying unit, the reconfiguration of the segments being performed by the segment reconfiguration unit and the computation of the dispersion compensation amount being performed by the dispersion compensation amount computing unit, wherein
    the update unit updates the dispersion compensation amount in the one of the spans of the optical network with a selected one of the computed dispersion compensation amounts obtained as a result of the repeated computations performed by the repeating unit, the selected dispersion compensation amount being capable of minimizing the number of the specific type paths.

3. The dispersion compensation design system as claimed in claim 1, wherein
    the segment reconfiguration unit solves a mixed integer programming problem with an objective function to maximize the number of the specific type paths based on a constraint condition in which no ports in a hub node that are overlapped with ports of nodes adjacent to the hub node are selected, the hub node being configured to have three or more of the spans.

4. The dispersion compensation design system as claimed in claim 1, wherein
    the segment reconfiguration unit solves a mixed integer programming problem with an objective function to maximize the number of the specific type paths based on a constraint condition in which a number of inter-port connections connecting adjacent nodes within a hub node is equal to a number of allowable connections within the hub node.

5. The dispersion compensation design system as claimed in claim 1, wherein
    the segment reconfiguration unit solves a mixed integer programming problem with an objective function to maximize the number of the specific type paths based on a constraint condition in which the specific type paths are included in the segments if the inter-port connections connecting the adjacent nodes within the hub node desired for allowing the specific type paths to be included in the segments are selected.

6. A method for designing arrangement of dispersion compensators, the method comprising:
dividing an optical network into a plurality of segments of a linear network or a ring network;
classifying one of paths of the optical network, as a specific type path, the one of the paths being incapable of transmitting an optical signal by itself and contained in a longer one of the paths having a route longer than that of the one of the paths and capable of transmitting the optical signal;
reconfiguring the segments so as to maximize a number of the specific type paths;
computing a dispersion compensation amount in one of spans of the optical network so as to minimize the number of the specific type paths within the reconfigured segment; and
updating the dispersion compensation amount in the one of the spans of the optical network with the computed dispersion compensation amount.

7. The method as claimed in claim 6, further comprising:
repeating the classification of the path, the reconfiguration of the segments and the computation of the dispersion compensation amount; and
updating the dispersion compensation amount in the one of the spans of the optical network with a selected one of the computed dispersion compensation amounts obtained as a result of the repeated computations, the selected dispersion compensation amount being capable of minimizing the number of the specific type paths.

8. The method as claimed in claim 6, wherein
a mixed integer programming problem is solved with an objective function to maximize the number of the specific type paths based on a constraint condition in which no ports in a hub node that are overlapped with ports of nodes adjacent to the hub node are selected, the hub node being configured to have three or more of the spans.

9. The method as claimed in claim 6, wherein
a mixed integer programming problem is solved with an objective function to maximize the number of the specific type paths based on a constraint condition in which a number of inter-port connections connecting adjacent nodes within a hub node is equal to a number of allowable connections within the hub node.

10. The method as claimed in claim 6, wherein
a mixed integer programming problem is solved with an objective function to maximize the number of the specific type paths based on a constraint condition in which the specific type paths are included in the segments if the inter-port connections connecting the adjacent nodes within the hub node desired for allowing the specific type paths to be included in the segments are selected.

* * * * *